United States Patent

Shimada et al.

[11] 4,355,151
[45] Oct. 19, 1982

[54] AROMATIC COPOLYAMIDE CONTAINING 3,4'-DIAMINO DIPHENYLENE MOIETY

[75] Inventors: Keizo Shimada; Hiroshi Mera; Noriaki Sasaki; Akihiro Aoki, all of Iwakuni, Japan

[73] Assignee: Teijin Limited, Osaka, Japan

[21] Appl. No.: 120,992

[22] Filed: Feb. 13, 1980

[30] Foreign Application Priority Data

Feb. 26, 1979 [JP] Japan .................. 54-20685

[51] Int. Cl.$^3$ ............................. C08G 69/32
[52] U.S. Cl. .................... 528/183; 528/179; 528/180; 528/182; 528/184; 528/208; 528/229; 528/321; 528/331; 528/337; 528/340; 528/344; 528/348
[58] Field of Search ............... 528/348, 344, 340, 337, 528/331, 321, 229, 208, 184, 183, 182, 180, 179, 176

[56] References Cited

U.S. PATENT DOCUMENTS 4,075,172  2/1978  Ozawa et al. ................... 528/348

Primary Examiner—Harold D. Anderson
Attorney, Agent, or Firm—Burgess, Ryan and Wayne

[57] ABSTRACT

An aromatic copolyamide comprising recurring units (A) of the formula (I), (B) of the formula (II) and (C) of the formula (III):

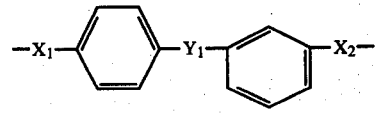

(I)

-continued $$-X_3-Ar_1-X_4-$$ (II)

and $$-X_5-Ar_2-X_6-$$ (III)

wherein in (I), (II) and (III) $Ar_1$ is phenylene, naphthylene or biphenylene radicals, each having two valence bonds oriented meta; $Ar_2$ is phenylene, naphthylene or biphenylene radicals, each having two valence bonds oriented coaxially or in parallel to each other and radicals of the formula (IV):

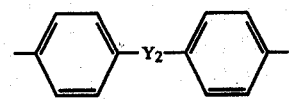

wherein $Y_1$ and $Y_2$ are independently;

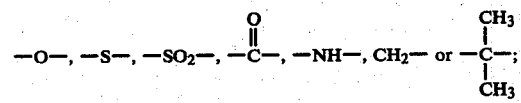

and; $X_1, X_2, X_3, X_4, X_5$ and $X_6$ respectively are independently —NH— and —CO— radicals, connected to each other to form an amide bond (—NHCO— or —CHNH—), and the molar proportions of said recurring units (A), (B) and (C) fall within a quadrilateral defined by the co-ordinates P, Q, R and S or on a twice-turned line defined by the co-ordinates Q,R,S, and P:

P (A 50, B 5, C 45)
Q (A 5, B 5, C 90)
R (A 5, B 40, C 55) and
S (A 50, B 15, C 35)

on a triangular composition diagram.

10 Claims, 1 Drawing Figure

AROMATIC COPOLYAMIDE CONTAINING 3,4'-DIAMINO DIPHENYLENE MOIETY

FIELD OF THE INVENTION

The present invention relates to a fiber- or film-forming aromatic copolyamide and a method for producing the same. More particularly, the present invention relates to a fiber- or film-forming aromatic copolyamide capable of forming a solution thereof having proper fluidity and excellent stability, which solution is useful for producing shaped articles, such as fibers and films, having a high thermal resistance, a high resistance to chemicals, excellent mechanical strength and Young's modulus, and a method for producing the same.

BACKGROUND OF THE INVENTION

It is known that aromatic polyamide resins exhibit excellent thermal properties, chemical resistance, mechanical strength and electric insulating properties. Accordingly, fibers or filaments made from aromatic polyamides exhibit excellent thermal properties, for example, a high melting point and excellent heat resistance, and therefore, are useful as heat resistant fibers or filaments. Also, aromatic polyamide fibers or filaments exhibit excellent mechanical properties, for example, a high initial Young's modulus and an excellent tenacity, and therefore, are useful as rubber reinforcing materials, for example, tire cord, and as a reinforcing material for thermoplastic and thermosetting resin articles.

It is known that aromatic homopolymers or copolymers containing an aromatic component having two valence bonds oriented coaxially or in parallel to each other, for example, poly-p-phenylene terephthalamide, are useful for producing fibers or filaments having a high Young's modulus and tenacity. However, the above-mentioned type of aromatic polyamide, which is symmetrical in structure and has excellent mechanical strength, exhibits poor solubility in the usual solvents and has a poor shaping property.

The above-mentioned disadvantages in solubility and shaping property of the conventional aromatic polyamide can be somewhat reduced by introducing a recurring m-phenylene unit having two valence bonds oriented meta into a backbone chain in the molecule of the aromatic polyamide. However, the introduction of the m-phenylene unit causes a loss in the mechanical properties of the resultant aromatic polyamide article.

An aromatic copolyamide having high solubility can be obtained by introducing a recurring unit of the formula:

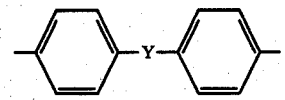

wherein Y represents a member selected from the group consisting of

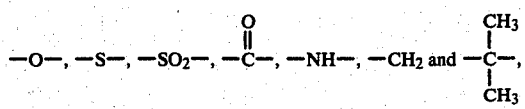

into the backbone chain of the molecule of the conventional aromatic polyamide.

This type of aromatic copolyamide is disclosed in Japanese Patent Application Publication (Kokoku) No. 53-32838/1978, and is useful for producing fibers or films having excellent mechanical properties. However, the excellent mechanical properties can be created only by applying a drawing operation to the aromatic copolyamide fiber or film at a high draw ratio and an elevated temperature. This high draw ratio, high temperature drawing operation causes the production of the fiber or film to be expensive and poor in efficiency. Therefore, it is strongly desired to provide a new type of aromatic polyamide having not only excellent thermal properties and mechanical properties, but also, superior solubility in usual solvents, and being capable of readily shaped into various shaped articles, for example, fibers and films.

SUMMARY OF THE INVENTION

An object of the present invention is to provide a fiber- or film-forming aromatic copolyamide having a high degree of solubility in organic solvents and excellent shaping property and stability, and a method for producing the same.

Another object of the present invention is to provide a fiber- or film-forming aromatic copolyamide which is useful for producing, at high efficiency, fibers or films having excellent thermal properties, chemical resistance and mechanical properties, and a method for producing the same.

The above-mentioned objects of the present invention can be attained by the fiber- or film-forming aromatic copolyamide of the present invention, which comprises at least one recurring unit (A) of the formula (I), at least one recurring unit (B) of the formula (II) and at least one recurring unit (C) of the formula (III):

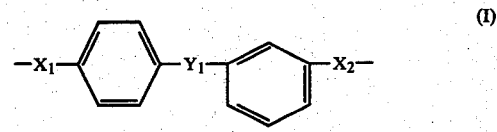

in which formulae (I), (II) and (III), $Y_1$ represents a member selected from the group consisting of

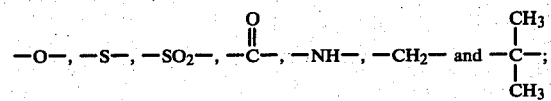

$Ar_1$ represents a member selected from the group consisting of phenylene, naphthylene and biphenylene radicals, each having two valence bonds oriented meta; $Ar_2$ represents a member selected from the group consisting of phenylene, naphthylene and biphenylene radicals, each having two valence bonds oriented coaxially or in parallel to each other and radicals of the formula (IV):

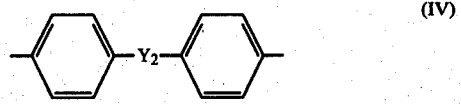

wherein $Y_2$ represents a member selected from the same group as that set forth above for $Y_1$ and may be the same as or different from $Y_1$, and; $X_1$, $X_2$, $X_3$, $X_4$, $X_5$ and $X_6$ respectively represent a member selected from the group consisting of —NH— and —CO— radicals, and in which copolyamide the recurring units are connected to each other to form a molecule of copolyamide in such a manner that any one member of $X_1$ through $X_6$ is connected to one of the remaining five members, which one is different from the former one, to form an amide bond (—NHCO— or —CONH—), and the molar proportion of the recurring units (A), (B) and (C) represented by a triangular composition diagram falls within a quadrilateral defined by the co-ordinates P, Q, R and S or on a twice-turned line defined by the co-ordinates Q, R, S and P:

P (A 50, B 5, C 45)
Q (A 5, B 5, C 90)
R (A 5, B 40, C 55) and
S (A 50, B 15, C 35).

The above-mentioned fiber- or film-forming aromatic copolyamide can be produced by the method of the present invention comprising copolymerizing at least one aromatic monomeric compound (A′) having a group of the formula (I) with at least one aromatic monomeric compound (B′) having a group of the formula (II) and at least one aromatic monomeric compound (C′) having a group of the formula (III):

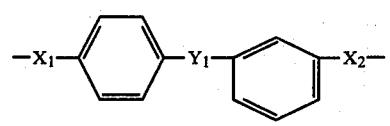
(I)

$$-X_3-Ar_1-X_4- \quad (II)$$
and
$$-X_5-Ar_2-X_6- \quad (III)$$

in which formulae (I), (II) and (III), $Y_1$ represents a member selected from the group consisting of

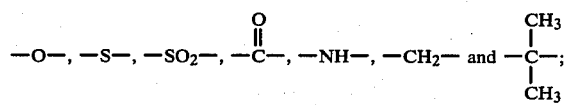

$Ar_1$ represents a member selected from the group consisting of phenylene, naphthylene and biphenylene radicals, each having two valence bonds oriented meta; $Ar_2$ represents a member selected from the group consisting of phenylene, naphthylene and biphenylene radicals, each having two valence bonds oriented coaxially or in parallel to each other, and radicals of the formula (IV):

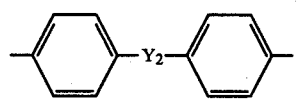
(IV)

in which $Y_2$ represents a bond selected from the same group as that set forth above for $Y_1$ and may be the same as or different from $Y_1$, and; $X_1$, $X_2$, $X_3$, $X_4$, $X_5$ and $X_6$ respectively represent a member selected from the group consisting of —NH— and —CO— radicals; said aromatic compounds (A′), (B′) and (C′) being capable of reacting with each other to form a molecule of copolyamide in such a manner that any one member of $X_1$ through $X_6$ is bonded with one of the remaining five members, which one is different from the former one, to form an amide bond (—NHCO— or —CONH—), in which method, the molar proportion of said aromatic compounds (A′), (B′) and (C′) represented by a triangular composition diagram falls within a quadilateral defined by the coordinates P, Q, R and S or on a twice-turned line defined by the coordinates Q, R, S and P:

P (A′ 50, B′ 5, C′ 45)
Q (A′ 5, B′ 5, C′ 90)
R (A′ 5, B′ 40, C′ 55) and
S (A′ 50, B′ 15, C′ 35).

BRIEF DESCRIPTION OF THE DRAWING

The drawing is a triangular composition diagram showing a range of the molar proportion of recurring units (A), (B) and (C) in the aromatic copolyamide of the present invention.

DETAILED DESCRIPTION OF THE INVENTION

Figure 1:
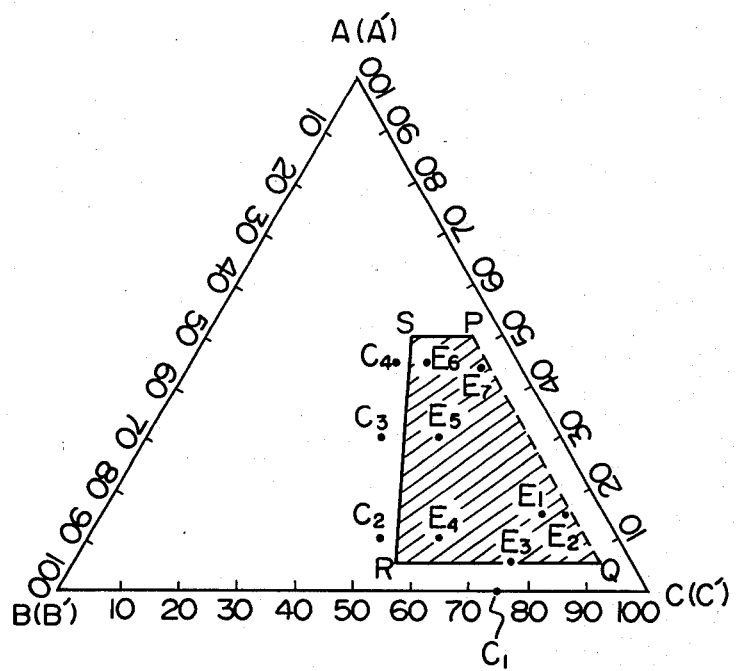

The aromatic copolyamide comprises at least one recurring unit (A) of the formula (I), at least one recurring unit (B) of the formula (II) and at least one recurring unit (C) of the formula (II) connected to each other to form a molecule of the copolyamide.

In the formula (I):

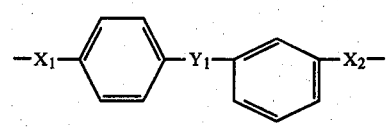
(I)

$Y_1$ represents a bond selected from —O—, —S—, —SO$_2$—, —CO—, —NH—, —CH$_2$— and —C(CH$_3$)$_2$—, preferably, from —O—, —S—, —SO$_2$— and —CO—. It is most preferable that $Y_1$ consist of a bond —O—.

In the formula (II), —X$_3$—Ar$_1$—X$_4$—, Ar$_1$ represents a member selected from phenylene, naphthylene and biphenylene, preferably, from phenylene and naphthylene, each having two valence bonds oriented meta, more preferably, from m-phenylene and 1,3-naphthylene radicals. It is most preferably, that Ar$_1$ consist of m-phenylene.

In the formula (III), —X$_5$—Ar$_2$—X$_6$—, Ar$_2$ represents phenylene, naphthylene and biphenylene radicals, each having two valence bonds oriented coaxially or in parallel to each other and radicals of the formula (IV);

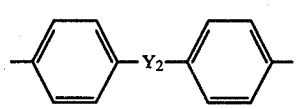
(IV)

It is preferable that Ar$_2$ be selected from the above-defined phenylene, naphthylene and biphenylene radicals. The more preferable radicals for Ar$_2$ are p-phenylene, 4,4′-biphenylene, 1,5-naphthylene and 2,6-naphthylene. The most preferable radical for Ar$_2$ is p-phenylene.

Accordingly, the most preferable aromatic copolyamide of the present invention comprises at least one recurring unit (A) of the formula (I) in which $Y_1$ is —O, at least one recurring unit (B) of the formula (II) in which $Ar_1$ is m-phenylene and at least one recurring unit (C) of the formula (III) wherein $Ar_2$ is p-phenylene.

In the formulae (I), (II) and (III), $X_1$, $X_2$, $X_3$, $X_4$, $X_5$ and $X_6$ respectively represent a —CO— radical or an —NH— radical. Also, in the aromatic copolyamide of the present invention, the recurring units (A), (B) and (C) are connected to each other to form a molecule of copolyamide in such a manner that any one member of $X_1$ through $X_6$ is connected to one of the remaining five members, which one is different from the former one, to form an amide bond (—NHCO— or —CONH—). That is, in the aromatic copolyamide of the present invention a molar amount of —CO— radical represented by two or more members of $X_1$ through $X_6$ is substantially equal to a molar amount of —NH— radical represented by the remaining members of $X_1$ through $X_6$.

In the aromatic copolyamide of the present invention, it is important that the molar proportions of the recurring units (A), (B) and (C) represented by a triangular composition diagram fall within a quadrilateral defined by the co-ordinates P, Q, R and S or on a twice-turned line defined by the co-ordinates Q, R, S and P:

P (A 50, B 5, C 45)
Q (A 5, B 5, C 90)
R (A 5, B 40, C 55) and
S (A 50, B 15, C 35).

The above-mentioned proportions usable for the present invention are indicated in the accompanying drawing.

Referring to the drawing, the molar proportions of the recurring units (A), (B) and (C) in the aromatic polyamide of the present invention must be within the quadrilateral PQRS or on the twice-turned line QRSP. The molar proportions falling on a straight line PQ fall outside the scope of the present invention. The molar proportions falling outside the above mentioned scope will cause the resultant aromatic copolyamide fiber or film to exhibit poor mechanical strength and Young's modulus.

The aromatic copolymide of the present invention preferably exhibits an intrinsic viscosity of from 1 to 7, more preferably, from 1.5 to 6, which is determined in a solution of 0.5 g of the copolyamide dissolved in 100 ml of 98% concentrated sulfuric acid, at a temperature of 30° C. In order to provide an aromatic copolyamide fiber having an excellent tenacity, it is preferable that the aromatic copolyamide exhibit an intrinsic viscosity of from 2.0 to 6.0. The aromatic copolyamide having the above-mentioned intrinsic viscosity is capable of being converted into a concentrated solution (dope) thereof, which is useful for producing the aromatic copolyamide fiber, film or other shaped article having excellent thermal stability and superior mechanical properties.

The aromatic copolyamide of the present invention can be produced by copolymerizing at least one aromatic monomeric compound (A') having a group of the formula (I) with at least one aromatic monomeric compound (B') having a group of the formula (II) and at least one aromatic monomeric compound (C') having a group of the formula (III).

Each of the aromatic monomeric compounds (A'), (B') and (C') may be in the form of an aromatic diamine, dicarboxylic acid halide or aminocarboxylic halide hydrogen chloride. That is, the aromatic monomeric compound (A') may be selected from the aromatic diamines, dicarboxylic acid halides and aminocarboxylic acid halide hydrogen chlorides, each having a radical of the formula:

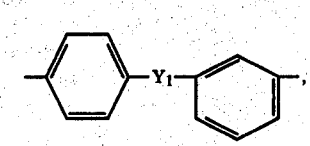

for example, 3,4'-diaminodiphenyl ether, 3,4'-diaminodiphenyl methane, 3,4'-diaminodiphenyl sulphone, 3,4'-diaminodiphonyl ketone, 3,4'-diaminodiphenyl thioether, 3,4'-diaminodiphenyl amine, 3,4'-dichloroformyldiphenyl ether, 3,4'-dichloroformyldiphenyl methane, 3,4'-dichloroformyldiphenyl sulphone, 3,4'-dichloroformyldiphenyl ketone, 3,4-dichloroformyldiphenyl thioether, 3,4'-dichloroformyldiphenyl amine hydrochloride and 3-amino-4'-chloroformyldiphenyl ether hydrochloride.

The aromatic monomeric compound (B') may be selected from the aromatic diamines, dicarboxylic acid halides and aminocarboxylic acid halide hydrogen chlorides, each having the radical $Ar_1$, for example, m-phenylenediamine, chloro-m-phenylenediamines, 2,4- and/or 2,6-toluylenediamine, isophthalic chloride, chloro isophthalic chlorides, methyl isophthalic chlorides, 1,4-naphthalenic chloride, methoxy isophthalic chloride and m-aminobenzoic chloride hydrochloride.

The aromatic monomeric compound (C') may be selected from the aromatic diamines, dicarboxylic acid halides and aminocarboxylic acid halide hydrogen chlorides, each having the radical $Ar_2$, for example, p-phenylenediamine, chloro-p-phenylenediamines, methyl-p-phenylenediamines, 1,5- or, 2,6-naphthalenediamine, dimethyl-benzizines, dichloro-benzizines, terephthalic chloride, chloroterephthalic chloride, methylterephthalic chloride, 1,5- or, 2,6-naphthalenic chloride and p-aminobenzoic chloride hydrochloride.

The copolymerization of the aromatic monomeric compounds (A'), (B') and (C') can be effected by any conventional polymerization method usable for producing polyamide, for example, a melt polymerization method, solid polymerization method, interface polymerization method or solution polymerization method. The more preferable methods are the interface and solution polymerization methods. The most preferable one is the solution polymerization method.

When the copolymerization is carried out in accordance with the solution polymerization method, the aromatic monomeric compounds (A'), (B') and (C') are dissolved in an organic solvent. The organic solvent preferably consists of at least one amide type solvent selected from the group consisting of N-methyl-2-pyrrolidone, N,N-dimethylacetamide, N,N-dimethylformamide, tetramethylurea, hexamethylphosphoramide, N-methyl-2-piperidone, N,N'-dimethylethyleneurea, N,N,N',N'-tetramethylmaloic amide, N-methylcaprolactam, N-acetylpyrrolidine, N,N-diethylacetamide, N-ethyl-2-pyrrolidone, N,N'-dimethylpropionic amide, N,N-dimethylisobutyl amide and N-mehtylformamide, N,N'-dimethylpropyleneurea. Especially, the preferable organic solvents for the method of the present invention are N-methyl-2-pyrrolidone, N,N-dimethylacetamide, N,N-dimethylformamide, hexamethylene phosphoramide and a mixture of two or more of the above-mentioned compounds.

The organic solvent may contain a solubilizing agent effective for increasing the dissolving activity of the solvent for the resultant aromatic copolyamide. The dissolving assistant may be selected from halides of metals of Groups I and II in the Periodic Table, as disclosed in Japanese Patent Application Publication (Kokoku) No. 35-16029 (1960).

In a preferred solution copolymerization operation, at least one aromatic monomeric compound in the form of an aromatic diamine is dissolved in an amide type solvent and, then, the resultant solution is mixed with the remaining aromatic monomeric compound(s) in the form of an aromatic dicarboxylic acid halide while being vigorously stirred, so as to start the copolymerization.

In the above-mentioned solution copolymerization operation, the amide type solvent is effective not only as a solvent for the aromatic monomeric compounds and the resultant aromatic copolyamide but, also, as an acid acceptor for a hydrogen halide, for example, hydrogen chloride, which is derived as a by-product from the copolymerization of the aromatic monomeric compounds. Sometimes, it is preferable to add a dissolving assistant, for example, lithium chloride or calcium chloride, to the copolymerization mixture before, during or after the copolymerization operation. Also, an additive consisting of at least one member selected from alkaline metal compounds, for example, lithium hydroxide, lithium carbonate, calcium hydroxide, calcium oxide and calcium carbonate, may be added to the copolymerization mixture before, during or after the copolymerization operation. The alkaline metal compounds are effective not only as acid acceptors or neutralizing agents for the copolymerization mixture, but also, as dissolving assistants for the resultant aromatic copolyamide.

The sum of concentrations of the aromatic monomeric compounds in the solution copolymerization mixture may be adjusted in consideration of the desired degree of polymerization, the desired viscosity of the copolymerization mixture, the type of the aromatic monomeric compounds, the type of the solvent and the desired copolymerization temperature. The most preferable sum of the concentrations can be known from the results of a series of preliminary copolymerization experiments. Usually, it is preferable that the sum of the concentrations of the aromatic monomeric compounds be in a arange of from 2 to 30% by weight, more preferably, from 4 to 20% by weight. Also, it is preferable that the solution copolymerization be carried out at a temperature of from −20° to 100° C., more preferably, from −10° to 70° C.

The aromatic copolyamide produced in accordance with the method of the present invention exhibits excellent solubility in an organic solvent, for example, amide type organic solvents, excellent heat resistance and superior chemical resistance. The aromatic copolyamide is extremely useful for producing various shaped articles, for example, fibers, filaments and films having not only excellent heat resistance and chemical resistance, but also, superior mechanical properties, such as tensile strength, abrasion resistance and Young's modulus. Also, the solution of the aromatic copolyamide can be used in various ways, for example, productions of fibers, films, sheets, fibrids and other shaped articles.

The excellent shaping property of the aromatic copolyamide of the present invention and the superior productivity of the shaped aromatic copolyamide articles will become apparent from the following description.

The resultant copolymerization mixture (in-situ dope) from the solution copolymerization operation can be utilized as a shaping solution of the aromatic copolyamide for producing a shaped article, for example, fiber or film.

The polymerization method for producing the aromatic copolyamide of the present invention is not limited to the above-mentioned solution polymerization method alone and a conventional melt, solid phase, oligomer or interface polymerization method or a combination of two or more of the above-mentioned methods can be applied to the production of the aromatic copolyamide of the present invention.

The resultant aromatic copolyamide may be recovered from the copolymerization mixture by a separating operation, for example, distillation, precipitation and extraction. The recovered aromatic copolyamide is dissolved in a proper organic solvent to prepare a shaping solution. This method is referred to as a redissolving method.

However, in the case where the solution polymerization method is applied to the production of the aromatic copolyamide of the present invention, since the resultant copolyamide exhibits excellent solubility in the copolymerization solvent, the copolyamide is completely dissolved in the polymerization solvent to form a clear solution. Therefore, it is advantageous in industrial use to utilize the resultant copolymerization mixture as a shaping solution of the aromatic copolyamide.

In any method for preparing the shaping solution of the aromatic copolyamide, the solvent is usually selected from the amide type solvents which include N-methyl-2-pyrrolidone, N,N-dimethylacetamide, N,N-dimethylformamide, tetramethylurea, hexamethylenephosphoramide, N-methyl-2-piperidine, N,N'-dimethylethyleneurea, N,N,N',N'-tetramethylmalonic amide, N-methylcaprolactam, N-acetylpyrrolidone, N,N-diethylacetamide, N-ethyl-2-pyrrolidone, N,N'-dimethylpropionic amide, N,N-dimethylisobutylamide, N-methylformamide, N,N'-dimethylpropyleneurea and mixtures of two or more of the above-mentioned compounds. In the preparation of the shaping solution, it is preferable that the concentration of the aromatic copolyamide be in a range of from 4 to 20% by weight, more preferably, from 5 to 15% by weight. If it is necessary, the shaping solution can contain a dissolving assistant consisting of at least one member selected from the halides of metals of Groups I and II in the Periodic Table, for example, lithium chloride, calcium chloride and magnesium bromide, in a concentration of from 0.2 to 10%, preferably, from 0.5 to 5% based on the entire weight of the shaping solution. The dissolving assistant is effective not only for increasing the dissolving activity of the solvent for the aromatic copolyamide, but also, for enhancing the stability of the shaping solution at an elevated temperature.

The shaping solution may be converted into any shaped article by any dry, wet, or dry jet-wet shaping method. In a case where a wet shaping method is applied to the shaping solution to produce a shaped article, for instance, filaments, the shaping solution (spinning solution or dope) is extruded through a nozzle, for example, a spinning orifice, into a coagulating liquid. Usually, it is preferable that the coagulating liquid consist of water or an aqueous solution containing a polar organic solvent. The polar organic solvent may be selected from the same group of amide type solvents as those usable for dissolving the aromatic copolyamide. Also, it is preferable that the polar organic solvent contained in the coagulating liquid be the same as that contained in the shaping solution. The coagulating liquid is preferably used at a temperature of from 0° C. to the boiling point of the coagulating liquid at the atmospheric pressure. The polar organic solvent is contained preferably in a concentration of 50% by weight or less, more preferably, 30% by weight or less, in the coagulating liquid.

In the case where the aromatic copolyamide in the shaping liquid has a certain composition or the shaping solution contains a certain type of metal halide and/or hydrogen halide in a certain amount, sometimes, an undesirably excessive degree of diffusion of the coagulating liquid into the stream of the extruded shaping solution occurs. This phenomenon causes the internal structure of the coagulated article to be loose and the mechanical strength of the coagulated article to be poor to such an extent that the coagulated article can not be smoothly drawn without breakage thereof. In such a case, it is preferable that the coagulating liquid contain a coagulating assistant consisting of at least one member selected from the group consisting of lithium chloride, sodium chloride, calcium chloride, magnesium chloride, zinc chloride, strontium chloride, aluminium chloride, tin (II) chloride, nickel chloride, calcium bromide, calcium nitrate, zinc nitrate and aluminium nitrate. The preferable coagulating assistants are magnesium chloride, calcium chloride, zinc chloride and aluminium chloride.

The above-mentioned wet shaping method is suitable for producing films or filaments from the shaping solution.

In the production of aromatic copolyamide filaments, the shaping (spinning) solution is extruded through a spinning orifice having a plurality of spinning holes and the resultant filamentary streams of the spinning solution are solidified in either one or both of the above-mentioned coagulating liquid (wet method) and evaporating atmosphere (dry method). For the spinning process, a conventional horizontal type or vertical type of wet spinning apparatus, or flowing-down under tension type spinning apparatus, can be used. If it is necessary, it is possible to utilize a flowing conduit or other device for making the spinning operation smooth.

In the wet spinning process for the aromatic copolyamide of the present invention, it is preferable that the coagulating operation in which a coagulating liquid containing the above-mentioned coagulating assistant is used, be followed with an additional coagulating operation in which the coagulating aromatic copolyamide filaments are introduced into a water bath at a temperature of from 0° to 100° C. The additional coagulating operation is effective for completing the coagulation by removing the solvent. Also, when the coagulating assistant accompanies the coagulated filaments, the additional coagulating operation is effective for washing off the coagulating assistant from the coagulated filaments.

It is clear from the above description that the aromatic copolyamide of the present invention is readily converted into filaments by using the usual spinning method and apparatus, without using a dangerous or harmful solvent, such as concentrated sulfuric acid. That is, this spinning process is harmless and not dangerous for operators. Also, the resultant aromatic copolyamide filaments exhibit a dense internal structure.

The shaping solution also can be utilized for producing an aromatic copolymer film by means of a conventional spreading method or extruding method.

The filaments or films produced by the above-mentioned shaping methods, are usually subjected to a drawing operation which is effective for enhancing not only mechanical properties, for instance, tensile strength and Young's modulus, but also, thermal properties, such as thermal stability, of the filaments or films.

In the case of the conventional aromatic copolyamide filaments consisting of only the recurring units (A) and (C), a high mechanical strength and Young's modulus thereof can be obtained only by drawing the filaments at a high draw ratio of, for example, from 8, to 20, at a high temperature of, for example, from 450° to 550° C. In the case of the filaments consisting of the aromatic copolyamide of the present invention, however, excellent mechanical properties, for example, a tensile strength of 12 g/d or more and a proper ultimate elongation, of the filaments can be obtained by drawing the filaments under moderate conditions, for instance, at a relatively low temperature of from 250° to 500° C., preferably, from 300° to 450° C., at a relatively low draw ratio of from 3 to 15, preferably, from 4 to 10. The above-mentioned relatively low drawing ratio and temperature result in the consumption of energy necessary for the drawing operation being small and the drawing operation per se being carried out smoothly. Accordingly, the aromatic copolyamide of the present invention allows the drawing operation to be carried out in a manner which is economically and technically advantageous over that for the conventional aromatic copolyamide.

The drawing operation may be carried out in a single step or two or more steps by using a heating plate or cylindrical heating furnace. The drawn filaments or films may be heat-treated at a temperature equal to or higher than the drawing temperature to enhance the degree of crystallinity thereof. It should be noted that the aromatic copolyamide of the present invention exhibits surprising advantages not only in that the aromatic copolymide can be readily dissolved in the usual organic solvents to form a solution which can be utilized for the production of filaments or films, but also, in that the resultant filaments or film can be readily drawn under moderate conditions.

The filaments, fibers or other fibrous materials consisting of the aromatic copolyamide of the present invention which exhibit excellent mechanical and thermal properties, and be used in various ways industrially, for example, as reinforcing materials for tire cords and other rubber articles, and for thermoplastic and thermosetting resin articles, heat-resistant insulating materials, filtering fabrics and lightweight aggregate materials. Also, the films or sheets consisting of the aromatic copolyamides of the present invention can be used for heat resistant electrical insulating materials.

The features and advantages of the present invention will be further illustrated by the examples set forth below. However, it should be understood that these are intended only to be examples of the present invention and are not intended to limit the scope of the present invention in any way.

In the examples, the intrinsic viscosity ($\eta$ inh) of an aromatic copolyamide was determined in a solution of 0.5 g of the aromatic copolyamide, which had been recovered from a copolymerization mixture, dissolved

EXAMPLE 1

An aromatic copolyamide from:

15 molar % 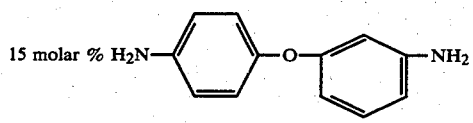

10 molar % 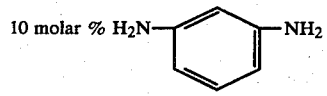

25 molar % 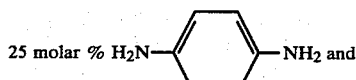 and 50 molar % 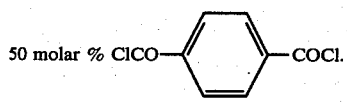

A solution was prepared by dissolving 1.201 g (0.006 mole) of 3,4'-diaminodiphenyl ether, 0.433 g (0.004 mole) of m-phenylenediamine and 1.081 g (0.010 mole) of p-phenylenediamine in 80 g of N-methyl-2-pyrrolidone in a dry nitrogen gas atmosphere. After the solution was cooled to a temperature of 0° C., 4.061 g (0.020 mole) of terephthalic acid chloride, which had been pulverized into fine particles and passed through a 30 mesh screen, were quickly added to the solution while vigorously stirring the solution. The resultant mixture was subjected to a copolymerization process. In the copolymerization process, the copolymerization mixture was stirred for 2 hours, while elevating the temperation thereof from 0° to 70° C., then, 1.482 g of calcium hydroxide were added to the copolymerization mixture to neutralize hydrogen chloride created from the copolymerization reaction and, finally the copolymerization reaction was additionally stirred at a temperature of 70° C. for 2 hours. The resultant polymer solution contained an aromatic copolyamide in concentration of 6.0% by weight. The aromatic copolyamide had molar proportions of a recurring unit (A) of the formula:

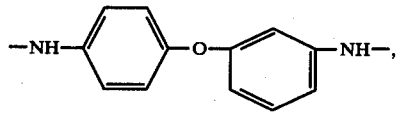

a recuring unit (B) of the formula

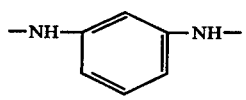

and the sum (C) of a recurring unit of the formula

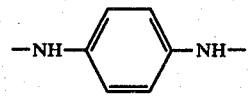

are a recurring unit of the formula

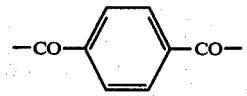

of 15:10:75, and an intrinsic viscosity of 3.21. The above-mentioned proportions are indicated by a co-ordinate $E_1$ in the accompanying drawing.

A portion of the resultant polymer solution was filtered, degassed and, then, extruded through a spinning orifice having 5 spinning holes, each having a diameter of 0.2 mm, into an aqueous coagulating liquid containing 10% by weight of N-methyl-2-pyrrolidone and contained in a horizontal type of coagulating vessel. The temperature of the coagulating liquid was maintained at 60° C. The extruded filamentary streams of the polymer solution traveled one meter in the coagulating liquid and the resultant solidified filaments were withdrawn from the coagulating liquid and wound on a bobbin at a speed of 6.0 m/min. The resultant filaments were rinsed with water at room temperature and, then, washed with hot water at a temperature of 95° C. An undrawn filament yarn was obtained.

The undrawn filament yarn was dried by bringing it into contact with a hot plate having a temperature of 110° C., and then, drawn at a draw ratio of 7.3 while bringing the yarn into contact with a hot plate having a temperature of 380° C. The properties of the resultant drawn aromatic copolyamide filaments were as follows.

| Denier of individual filament | 2.85 |
|---|---|
| Tensile strength | 20.7 g/d |
| Ultimate elongation | 5.0% |
| Young's modulus | 518 g/d |

The remaining portion of the polymer solution was filtered, degassed, spread on a heated glass plate, dried at a temperature of 140° C. for 10 minutes and, then, the dried film on the glass plate was immersed in water.

A transparent aromatic copolyamide film was separated from the glass plate, drawn in one direction at a draw ratio of 2.0 and, then, heat-treated at a temperature of 350° C., for 10 minutes, while maintaining the dimensions thereof constant. The resultant film exhibited a thickness of from 20 to 25 microns and the following properties:

| Tensile strength | 45 kg/mm$^2$ |
|---|---|
| Ultimate elongation | 30% |
| Young's modulus | 1600 kg/mm$^2$ |

COMPARATIVE EXAMPLE 1

A comparative aromatic copolyamide from:

25 molar % 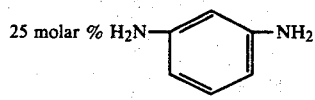

25 molar % 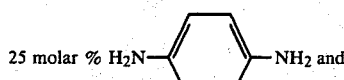 and 50 molar % 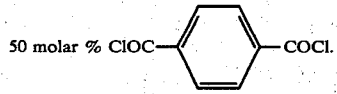

A solution was prepared by dissolving 1.801 g (0.010 mole) of m-phenylenediamine and 1.801 g (0.010 mole) of p-phenylenediamine in 80 g of N-methyl-2-pyrrolidone in a dry nitrogen gas atmosphere and, then, the solution was cooled to a temperature of 0° C. Thereafter, 4.061 g (0.020 mole) of terephthalicacid chloride, which had been pulverized into fine particles and passed through a 30 mesh screen, were rapidly added to the solution. The resultant copolymerization mixture was subjected to a copolymerization operation in which the mixture was stirred for 3 hours while elevating the temperature of the mixture from 0° C. to 80° C., then, 1.482 g of calcium hydroxide were added to the mixture to neutralize the by-product consisting of hydrogen chloride and, finally, the mixture was additionally stirred at a temperature of 70° C. for 2 hours.

The resultant polymer solution contained 5.4% by weight of a comparative aromatic copolyamide which exhibited an intrinsic viscosity of 3.81. The molar proportions of the recurring units (A), (B) and (C) in the comparative aromatic copolyamide is represented by a co-ordinate $C_1$ in the accompanying drawing. That is, the co-ordinate $C_1$ corresponds to the following molar proportions.

Recurring unit (A) of the formula: (I):0.
Recurring unit (B) of the formula:

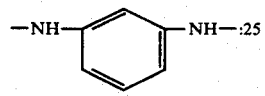

Sum (C) of recurring unit of the formula:

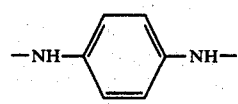

and recurring unit of the formula:

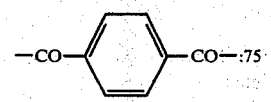

The polymer solution was converted into a filament yarn in the same manner as described in Example 1, except that the drawing ratio was 4.0. The resultant comparative aromatic copolyamide filaments exhibited the following properties.

| Denier: | 5.0 |
|---|---|
| Tensile Strength: | 9.4 g/d |
| Ultimate elongation: | 6.2% |
| Young's modulus: | 263 g/d |

EXAMPLE 2

An aromatic copolyamide from:

15 molar % 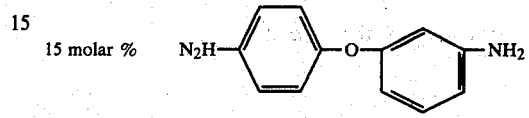

6 molar % 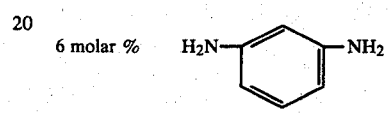

29 molar % 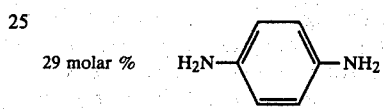

and 50 molar % 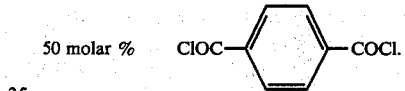

A solution was prepared by dissolving 2.402 g (0.012 mole) of 3,4'-diaminodiphenyl ether, 0.519 g (0.0048 mole) of m-phenylenediamine and 2.509 g (0.0232 mole) of p-phenylenediamine in 160 g of N-methyl-2-pyrrolidone in a dry nitrogen gas atmosphere and, then, the solution was cooled to a temperature of 0° C. Thereafter, 8.121 g (0.040 mole) of fine particles of terephthalic acid chloride, which had been passed through a 30 mesh screen, were rapidly added to the solution while vigorously stirring the solution. The resultant mixture was subjected to a copolymerization process in which the mixture was stirred for 2 hours while elevating the temperature of the mixture from 0° C. to 70° C., then, 2.964 g of calcium hydroxide were added to the mixture to neutralize a by-product consisting of hydrogen chloride and finally, the mixture was additionally stirred at a temperature of 70° C. for 2 hours.

The resulting polymer solution contained an aromatic copolyamide having an intrinsic viscosity of 2.50 and a composition represented by a co-ordinate $E_2$ in the accompanying drawing. The co-ordinate $E_2$ corresponds to the following proportions.

Recurring unit (A) of the formula:

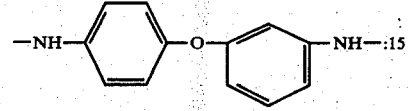

Recurring unit (B) of the formula:

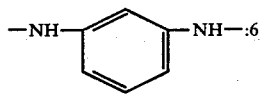:6

The sum (C) of recurring unit of the formula:

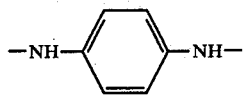

and recurring unit of the formula:

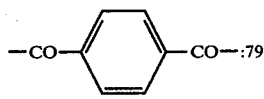:79

The polymer solution was filtered, degassed and, then, vertically extruded downward through five spinning holes each having a diameter of 0.2 mm at an extruding rate of 4.0 m/min. The resulting filamentary streams of the polymer solution were forwarded downward through a travel path of about 1 cm in the air atmosphere and, then, introduced into an aqueous coagulating liquid containing 20% by weight of N-methyl-2-pyrrolidone. The filamentary streams traveled about 1 meter in the coagulating liquid at room temperature. The resultant flament yarn was withdrawn at a speed of 4.0 m/min from the coagulating liquid, rinsed with water at room temperature and, then, washed with hot water at a temperature of 95° C., to provide an undrawn filament yarn.

The undrawn filament yarn was dried at a temperature of 110° C. by using a hot plate and, then, drawn at a draw ratio of 6.8 and at a temperature of 440° C. produced by a hot plate.

The resulting aromatic copolyamide filaments exhibited the following properties.

| Denier: | 2.4 |
| Tensile strength: | 20.0 g/d |
| Ultimate elongation: | 3.7% |
| Young's modulus: | 600 g/d |

EXAMPLE 3

An aromatic copolyamide from:

5 molar % 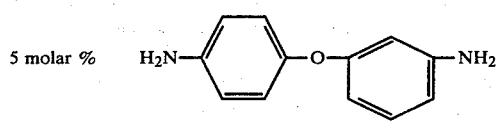

20 molar % 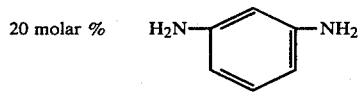

25 molar % 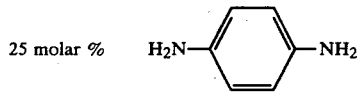

-continued 50 molar % 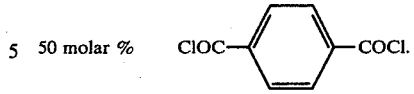

A solution was prepared by dissolving 0.801 g (0.004 mole) of 3,4'-diaminodiphenyl ether, 1.730 g (0.016 mole) of m-phenylenediamine and 2.163 g (0.020 mole) of p-phenylenediamine in 160 g of N-methyl-2-pyrrolidone in a dry nitrogen atmosphere. The solution was cooled to a temperature of 0° C. and, then, 8.121 g (0.040 mole) of terephthalic acid chloride, in the form of fine particles which had been passed through a 30 mesh screen, were quickly added to the solution while vigorously stirring the solution. The mixture was subjected to a copolymerization process in which the mixture was heated to a temperature of 70° C. and stirred at this temperature for 2 hours, then, 2.964 g of calcium hydroxide were added to mixture to neutralize a by-product consisting of hydrogen chloride, and finally, the mixture was additionally stirred at a temperature of 70° C. for one hour.

The resulting polymer solution contained 5.5% by weight of an aromatic copolyamide having an intrinsic viscosity of 3.53 and molar proportions of the recurring units (A), (B) and (C) represented by a co-ordinate $E_3$ in the accompanying drawing. The co-ordinate $E_3$ corresponds to the following molar proportions.

Recurring unit (A) of the formula:

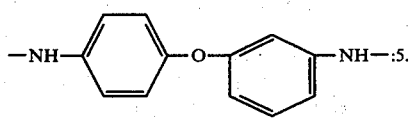:5.

Recurring unit (B) of the formula:

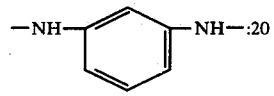:20

The sum (C) of recurring unit of the formula:

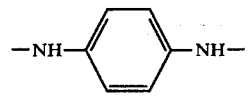

and recurring unit of the formula:

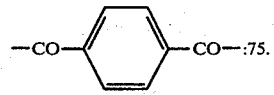:75.

The polymer solution was filtered, degassed and, then, vertically extruded downward through five spinning holes each having a diameter of 0.2 mm at an extruding rate of 6.0 m/min. The resulting filamentary streams of the polymer solution were passed through the air atmosphere for about 1 cm and, then, introduced into an aqueous coagulating liquid containing 20% by weight of N-methyl-2-pyrrolidone and having a temperature of 60° C. The filamentary streams were passed through the coagulating liquid for about one meter and, then, the coagulated filaments were withdrawn from the coagulating liquid at a speed of 6 m/min, rinsed with water at a temperature of 40° C., and finally, washed with hot water at a temperature of 95° C. to completey remove the solvent from the coagulated filaments. The resultant undrawn filament yarn was dried by bringing the yarn into contact with a hot plate at a temperature of 120° C. and, then, drawn at a draw ratio of 5.8 while bringing the yarn into contact with a hot plate heated to a temperature of 380° C.

The resultant drawn aromatic copolyamide filaments had the followin properties.

| Denier: | 3.6 |
|---|---|
| Tensile strength: | 14.2 g/d |
| Ultimate elongation: | 5.5% |
| Young's modulus: | 330 g/d |

EXAMPLE 4

An aromatic copolyamide from:

10 molar % 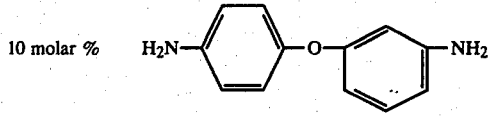

30 molar % 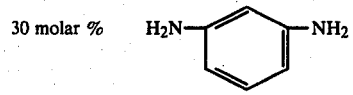

10 molar % 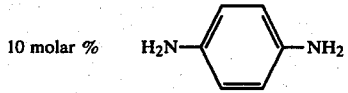

and 50 molar % 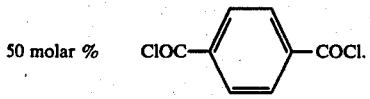

A solution was prepared by dissolving 0.801 g (0.004 mole) of 3,4'-diaminodiphenyl ether, 1.297 g (0.012 mole) of m-phenylenediamine and 0.433 g (0.004 mole) of p-phenylenediamine in 55 g of N-methyl-2-pyrrolidone, in a dry nitrogen gas atmosphere. After the solution was cooled to a temperature of 0° C., 4.061 g (0.020 mole) of terephthalic acid chloride in the form of fine particles, which had been passed through a 30 mesh screen, were quickly added to the cooled solution while vigorously stirring the mixture.

The resultant copolymerization mixture was subjected to a copolymerization process in which the mixture was heated to a temperature of 70° C. and stirred for about 2 hours, 1.482 g of calcium hydroxide were added to the mixture to neutralize the by-product consisting of hydrogen chloride and, finally, the mixture was additionally stirred, at a temperature of 70° C., for one hour.

The resultant polymer solution contained 8.6% by weight of an aromatic copolyamide, which had an intrinsic viscosity of 2.66 and molar proportions of the recurring units (A), (B) and (C) represented by a coordinate E4 in the accompanying drawing. The co-ordinate E4 corresponds to the following molar proportions.

Recurring unit (A) of the formula:

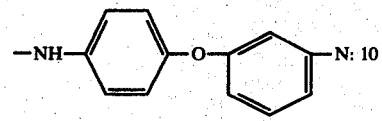

Recurring unit (B) of the formula:

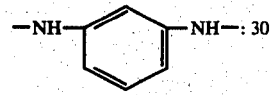

The cum (C) of recurring unit of the formula:

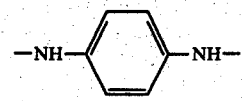

and recurring unit of the formula

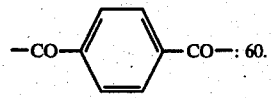

The polymer solution was filtered, degassed and, then, extruded through 5 spinning holes, each having a diameter of 0.2 mm, into an aqueous coagulating liquid containing 50% by weight of calcium chloride, having a temperature of 95° C. and contained in a horizontal type vessel. The extruded filamentary streams of the polymer solution was passed through the coagulating liquid for about one meter and, then, the coagulated filaments were withdrawn from the coagulating liquid at a speed of 4.0 m/min. The withdrawn filaments were rinsed with water at a temperature of from 5° to 10° C. and, then, washed with hot water at a temperature of 95° C.

The resultant undrawn aromatic copolyamide filament yarn was dried by bringing it into contact with a hot plate having a temperature of 110° C., and finally, drawn at a draw ratio of 4.1 while bringing it into contact with a hot plate having a temperature of 360° C.

The drawn filaments exhibited the following properties.

| Denier: | 6.48 |
|---|---|
| Tensile strength: | 14.8 g/d |
| Ultimate elongation: | 9.4% |
| Young's modulus: | 220 g/d |

COMPARATIVE EXAMPLE 2

A comparative aromatic copolyamide from:

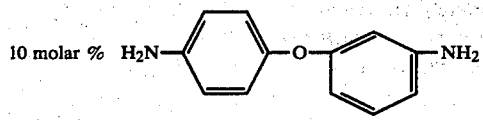

10 molar %

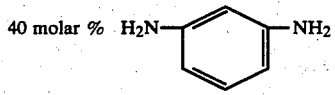

40 molar % and

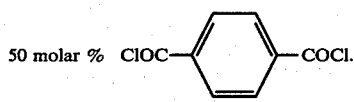

50 molar %

A solution was prepared by dissolving 0.801 g (0.004 mole) of 3,4'-diaminodiphenyl ether and 1.730 g (0.016 mole) of m-phenylenediamine, in 55 g N-methyl-2-pyrrolidone, in a dry nitrogen gas atmosphere. After the solution was cooled to a temperature of 0° C., 4.061 g (0.020 mole) of terephthalic acid chloride in the form of fine particles, which had been passed through a 30 mesh screen, were rapidly added to the solution while vigorously stirring the mixture.

The thus prepared mixture was subjected to a copolymerization process in which the mixture was heated from 0° C. to 70° C., while being stirred for 2 hours, and finally, stirred at a temperature of 70° C., for 2 hours, while neutralizing a by-product consisting of hydrogen chloride with 1.482 g of calcium hydroxide.

The resultant comparative polymer solution contained 7.8% by weight of a comparative aromatic copolyamide having an intrinsic viscosity of 2.65 and molar proportions of the recurring units (A), (B) and (C) represented by a co-ordinate C₂ in the accompanying drawing. The co-ordinate C₂ corresponds to the following molar proportions.

Recurring unit (A) of the formula:

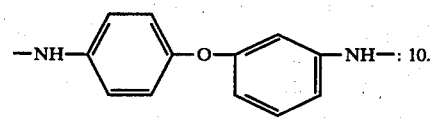

Recurring unit (B) of the formula:

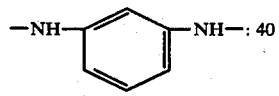

Recurring unit (C) of the formula:

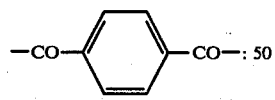

The comparative polymer solution was converted into filaments by the same spinning process as that described in Example 4. During the spinning process, it was observed that the coagulating activity of the comparative polymer solution was poorer than that of the polymer solution of the present invention, and therefore, the coagulated filaments were devitrified and frequently broken. The resultant drawn comparative aromatic copolyamide filaments, which had been drawn at a draw ratio of 3.1 and a temperature of 320° C., exhibited the following properties.

| Denier: | 9.7 |
|---|---|
| Tensile strength: | 7.6 g/d |
| Ultimate elongation: | 13.6% |
| Young's modulus: | 110 g/d |

EXAMPLE 5

An aromatic copolyamide from:

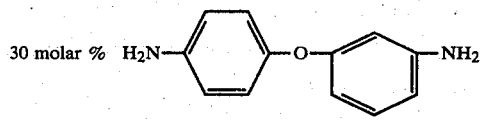

30 molar %

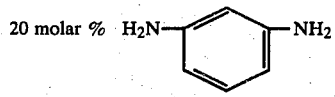

20 molar % and

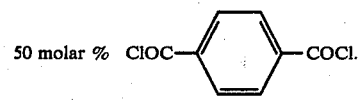

50 molar %

A solution was prepared by dissolving 2.402 g (0.012 mole) of 3,4'-diaminodiphenyl ether and 0.865 g (0.008 mole) of m-phenylenediamine in 55 g of N-methyl-2-pyrrolidone in a dry nitrogen gas atmosphere. After cooling to a temperature of 0° C. in an ice bath, the solution was quickly mixed with 4.061 g (0.020 mole) of terephthalic acid chloride in the form of fine particles, which had being passed through a 30 mesh screen, while been vigorously stirred. The thus prepared mixture was subjected to a copolymerization process in which the mixture was stirred for 2 hours while elevating the temperature of the mixture from 0° C. to 70° C. and, then, additionally stirred at the temperature of 70° C., for 2 hours, while neutralizing a by-product consisting of hydrogen chloride by adding 1.482 g of calcium hydroxide to the mixture.

The obtained polymer solution contained 9.0% by weight of an aromatic copolyamide which had an intrinsic viscosity of 2.44 and molar proportions of the recurring units (A), (B) and (C) represented by a co-ordinate E₅ in the accompanying drawing. The co-ordinate E₅ corresponds to the following molar proportions.

Recurring unit (A) of the formula:

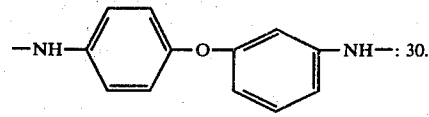

Recurring unit (B) of the formula:

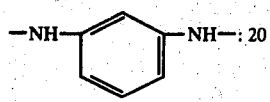

Recurring unit (C) of the formula:

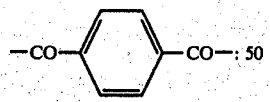

The polymer solution was filtered, degassed and, then, wet-spun by the same process as that described in Example 4. The thus-produced undrawn filaments were drawn at a draw ratio of 5.8 and a temperature of 320° C. The obtained drawn aromatic copolyamide filaments exhibited the following properties.

| Denier: | 4.63 |
|---|---|
| Tensile strength: | 12.3 g/d |
| Ultimate elongation: | 5.70% |
| Young's modulus: | 240 g/d |

COMPARATIVE EXAMPLE 3

A comparative aromatic copolyamide from:

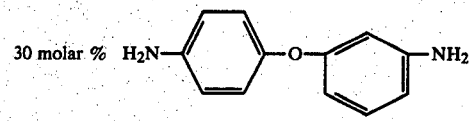

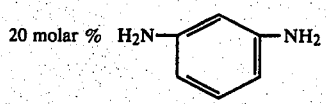

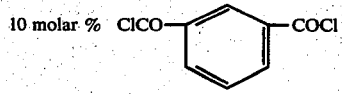

and

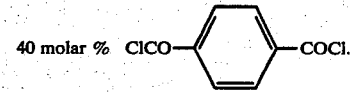

A solution was prepared by dissolving 2.402 g (0.012 mole) of 3,4'-diaminodiphenyl ether and 0.865 g (0.008 mole) of m-phenylenediamine in 55 g of N-methyl-2-pyrrolidone in a dry nitrogen gas atmosphere. After cooling to a temperature of 0° C. in an ice bath, the solution was quickly mixed with both 3.248 g (0.016 mole) of terephthalic acid chloride and 0.824 g (0.004 mole) of isophthalic acid chloride, each in the form of fine particles which had been passed through a 30 mesh screen, while being vigorously stirred. The thus prepared mixture was subjected to a copolymerization process in which the mixture was stirred for 3 hours while elevating the temperature of the mixture from 0° C. to 70° C. and, then, additionally stirred at the temperature of 70° C., for 2 hours, while neutralizing a by-product consisting of hydrogen chloride by adding 1.482 g of calcium hydroxide to the mixture.

The obtained polymer solution contained 8.9% by weight of a comparative aromatic copolyamide which had an intrinsic viscosity of 2.19 and molar proportions of the recurring units (A), (B) and (C) represented by a co-ordinate $C_3$ in the accompanying drawing. The co-ordinate $C_3$ corresponds to the following molar proportions.

Recurring unit (A) of the formula:

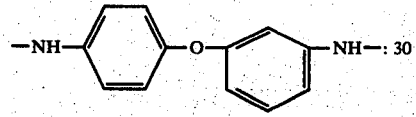

The sum (B) of recurring unit of the formula:

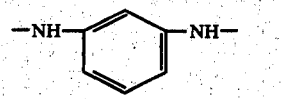

and recurring unit of the formula:

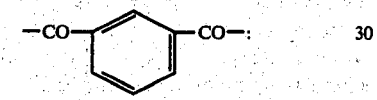

Recurring unit (C) of the formula:

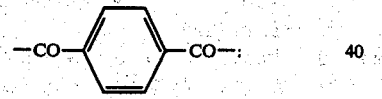

The polymer solution was filtered, degassed and, then, wet-spun by the same process as that described in Example 4, except that the rinsing water had a temperature of from 5° to 7° C. During the wet-spinning process, it was observed that the coagulated filaments were devitrified and frequently broken. The thus-produced undrawn filaments were dried and drawn in the same manner as that mentioned in Example 4, except that the draw ratio was 6.5 and the drawing temperature was 260° C. The obtained drawn aromatic copolyamide filaments exhibited the following properties.

| Denier: | 4.5 |
|---|---|
| Tensile strength: | 7.5 g/d |
| Ultimate elongation: | 9.2% |
| Young's modulus: | 148 g/d |

EXAMPLE 6

An aromatic copolyamide from:

-continued 5 molar % 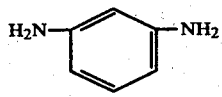

10 molar % 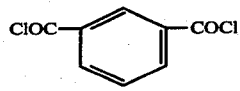

and 40 molar % 

A solution was prepared by dissolving 3.603 g (0.018 mole) of 3,4'-diaminodiphenyl ether and 0.216 g (0.002 mole) of m-phenylenediamine in 55 g of N-methyl-2-pyrrolidone in a dry nitrogen gas atmosphere. After cooling to a temperature of 0° C. in an ice bath, the solution was quickly mixed with both 3.248 g (0.016 mole) of terephthalic acid chloride and 0.812 g (0.004 mole) of isophthalic acid chloride, each in the form of fine particles which had been passed through a 30 mesh screen, while being vigorously stirred. The thus prepared mixture was subjected to a copolymerization process in which the mixture was stirred for 3 hours while elevating the temperature of the mixture from 0° C. to 70° C. and, then, additionally stirred at the temperature of 70° C., for 2 hours, while neutralizing a by-product consisting of hydrogen chloride by adding 1.482 g of calcium hydroxide to the mixture.

The obtained polymer solution contained 9.7% by weight of an aromatic copolyamide which had an intrinsic viscosity of 2.98 and molar proportions of the recurring units (A), (B) and (C) represented by a co-ordinate $E_6$ in the accompanying drawing. The co-ordinate $E_6$ corresponds to the following molar proportions.

Recurring unit (A) of the formula:

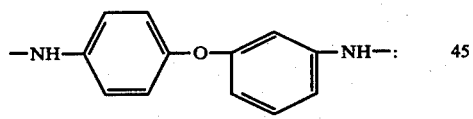 45

The sum (B) of recurring unit (B) of the formula:

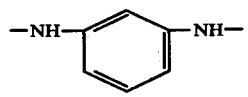

and recurring unit of the formula:

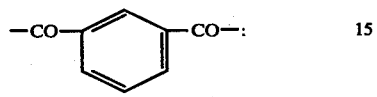 15

Recurring unit (C) of the formula:

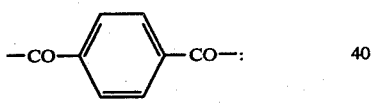 40

The polymer solution was filtered, degassed and, then, wet-spun by the same process as that described in Example 4, except that the coagulating liquid contained 60% by weight of calcium chloride. The rinsing water had a temperature of from 10° to 15° C. and the washing water had a temperature of 90° C. The thus-produced undrawn filaments were dried and drawn in the same manner as that described in Example 4, except that the draw ratio was 3.1 and the drawing temperature was 300° C. The obtained drawn aromatic copolyamide filaments exhibited the following properties.

| | |
|---|---|
| Denier: | 6.2 |
| Tensile strength: | 12.2 g/d |
| Ultimate elongation: | 7.5% |
| Young's modulus: | 230 g/d |

COMPARATIVE EXAMPLE 4

A comparative aromatic copolyamide from:

45 molar % 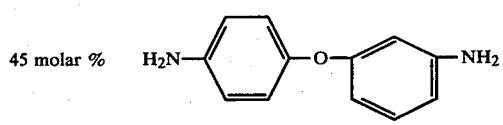

5 molar % 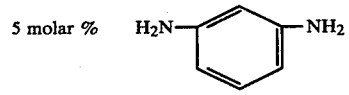

15 molar % 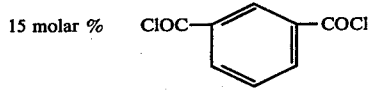

and 35 molar % 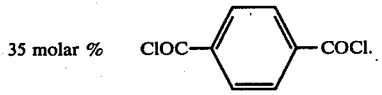

A solution was prepared by dissolving 3.603 g (0.018 mole) of 3,4α-diaminodiphenyl ether and 0.216 g (0.002 mole) of m-phenylenediamine in 55 g of N-methyl-2-pyrrolidone in a dry nitrogen gas atmosphere. After cooling to a temperature of 0° C., the solution was quickly mixed with both 2.842 g (0.014 mole) of terephthalic acid chloride and 1.218 g (0.006 mole of isophthalic acid chloride, each in the form of fine particles which had been passed through a 30 mesh screen, while being vigorously stirred. The thus prepared mixture was subjected to a copolymerization process in which the mixture was stirred for 3 hours while elevating the temperature of the mixture from 0° C. to 70° C. and, then, additionally stirred at the temperature of 70° C., for one hour, while neutralizing a by-product consisting of hydrogen chloride by adding 1.482 g of calcium hydroxide to the mixture.

The obtained polymer solution contained 9.7% by weight of a comparative aromatic copolyamide which had an intrinsic viscosity of 2.23 and molar proportions of the recurring units (A), (B) and (C) represented by a co-ordinate C₄ in the accompanying drawing. The co-ordinate C₄ corresponds to the following molar proportions.

Recurring unit (A) of the formula:

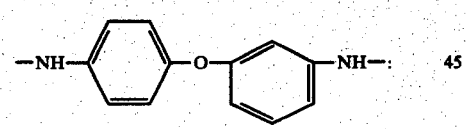 45

The sum (B) of recurring unit of the formula:

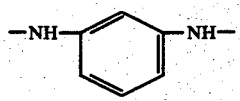

and recurring unit of the formula:

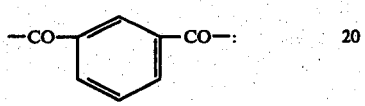 20

Recurring unit (C) of the formula:

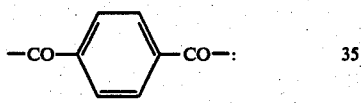 35

The polymer solution was filtered, degassed and, then, wet-spun by the same process as that described in Example 6. The thus-produced undrawn filaments were drawn at a draw ratio of 4.1 and a temperature of 300° C. The obtained drawn comparative aromatic copolyamide filaments exhibited the following properties.

| Denier: | 6.26 |
|---|---|
| Tensile strength: | 7.80 g/d |
| Ultimate elongation: | 8.5% |
| Young's modulus: | 150 g/d |

EXAMPLE 7

An aromatic copolyamide from:

44 molar % 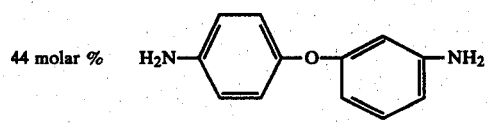

6 molar % 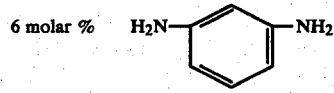

and 50 molar % 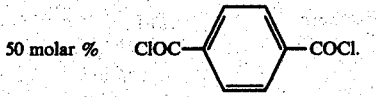

A solution was prepared by dissolving 3.523 g (0.0176 mole) of 3,4'-diaminodiphenyl ether and 0.260 g (0.0024 mole) of m-phenylenediamine in 55 g of N-methyl-2-pyrrolidone in a dry nitrogen gas atmosphere. After cooling to a temperature of 0° C., the solution was quickly mixed with 4.061 g (0.020 mole) of terephthalic acid chloride in the form of fine particles, which had been passed through a 30 mesh screen, while been vigorously stirred. The thus prepared mixture was subjected to a copolymerization process in which the mixture was stirred for 3 hours while elevating the temperature of the mixture from 0° C. to 70° C. and, then, additionally stirred at the temperature of 70° C., for 2 hours, while neutralizing a by-product consisting of hydrogen chloride by adding 1.482 g of calcium hydroxide to the mixture.

The obtained polymer solution contained 9.7% by weight of an aromatic copolyamide which had an intrinsic viscosity of 2.45 and molar proportions of the recurring units (A), (B) and (C) represented by a co-ordinate E₇ in the accompanying drawing. The co-ordinate E₇ corresponds to the following molar proportions.

Recurring unit (A) of the formula:

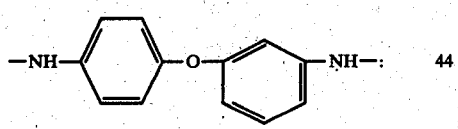 44

Recurring unit (B) of the formula:

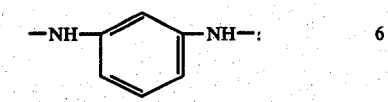 6

Recurring unit (C) of the formula:

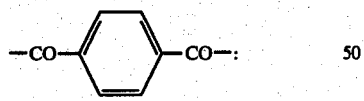 50

The polymer solution was filtered, degassed and, then, wet-spun by the same process as that described in Example 4, except that the spinning holes each had a diameter of 0.15 mm and the coagulating temperature was 90° C. The resultant undrawn filaments were dried by bringing them into contact with a hot plate having a temperature of 120° C. and, then, the dried filaments were drawn at a draw ratio of 7.0 and a temperature of 420° C. The obtained drawn aromatic copolyamide filaments exhibited the following properties.

| Denier: | 1.90 |
|---|---|
| Tensile strength: | 139 g/d |
| Ultimate elongation: | 5.1% |
| Young's modulus: | 315 g/d |

EXAMPLES 8 THROUGH 12

In each of the Examples 8 through 12, an aromatic copolyamide was prepared from the monomeric compounds indicated in Table 1 by the same method as that described in Example 1.

The resultant copolyamide was converted into a multifilament yarn by the same spinning and drawing methods as those described in Example 2.

The resultant multifilament yarn exhibited properties indicated in Table 2.

TABLE 1

| Monomer | Amount | Example 8 | 9 | 10 | 11 | 12 |
|---|---|---|---|---|---|---|
| $H_2N\text{-}\phi\text{-}O\text{-}\phi\text{-}NH_2$ | molar % | 0 | 0 | 25 | 25 | 25 |
| | mole | 0 | 0 | 0.017 | 0.050 | 0.017 |
| | g | 0 | 0 | 3.404 | 10.012 | 3.404 |
| $H_2N\text{-}\phi\text{-}SO_2\text{-}\phi\text{-}NH_2$ | molar % | 15 | 0 | 0 | 0 | 0 |
| | mole | 0.012 | 0 | 0 | 0 | 0 |
| | g | 2.979 | 0 | 0 | 0 | 0 |
| $H_2N\text{-}\phi\text{-}CH_2\text{-}\phi\text{-}NH_2$ | molar % | 0 | 15 | 0 | 0 | 0 |
| | mole | 0 | 0.012 | 0 | 0 | 0 |
| | g | 0 | 2.379 | 0 | 0 | 0 |
| $H_2N\text{-}\phi\text{-}NH_2$ (m) | molar % | 10 | 10 | 10 | 10 | 0 |
| | mole | 0.008 | 0.008 | 0.007 | 0.020 | 0 |
| | g | 0.865 | 0.865 | 0.735 | 2.163 | 0 |
| $H_2N\text{-}naphthyl\text{-}NH_2$ | molar % | 0 | 0 | 0 | 0 | 10 |
| | mole | 0 | 0 | 0 | 0 | 0.007 |
| | g | 0 | 0 | 0 | 0 | 1.075 |
| $H_2N\text{-}\phi\text{-}NH_2$ | molar % | 25 | 25 | 15 | 0 | 15 |
| | mole | 0.020 | 0.020 | 0.010 | 0 | 0.010 |
| | g | 2.163 | 2.163 | 1.103 | 0 | 1.103 |
| $H_2N\text{-}\phi\text{-}\phi\text{-}NH_2$ | molar % | 0 | 0 | 0 | 15 | 0 |
| | mole | 0 | 0 | 0 | 0.030 | 0 |
| | g | 0 | 0 | 0 | 5.527 | 0 |
| ClOC-naphthyl-COCl | molar % | 0 | 0 | 25 | 0 | 0 |
| | mole | 0 | 0 | 0.017 | 0 | 0 |
| | g | 0 | 0 | 4.301 | 0 | 0 |
| ClOC-$\phi$-COCl | molar % | 50 | 50 | 25 | 50 | 50 |
| | mole | 0.040 | 0.040 | 0.017 | 0.100 | 0.034 |
| | g | 8.121 | 8.121 | 3.452 | 20.303 | 6.904 |

TABLE 2

| Item | Example 8 | 9 | 10 | 11 | 12 |
|---|---|---|---|---|---|
| Denier | 1.30 | 1.20 | 1.12 | 3.80 | 1.65 |
| Tensile strength g/d | 16.1 | 16.2 | 21.2 | 13.2 | 20.4 |
| Ultimate elongation % | 5.3 | 4.6 | 4.7 | 4.0 | 5.1 |
| Young's modulus g/d | 380 | 437 | 588 | 390 | 612 |

What we claim is:

1. A fiber- or film-forming aromatic copolyamide which comprises at least one recurring unit (A) of the formula (I), at least one recurring unit (B) of the formula (II) and at least one recurring unit (C) of the formula (III):

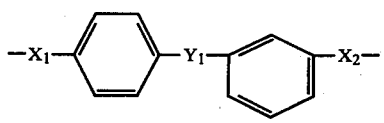
$\quad\quad\quad\quad\quad\quad\quad\quad\quad\quad\quad$ (I)

$$-X_3-Ar_1-X_4 \quad\quad\quad (II)$$
and
$$-X_5-Ar_2-X_6- \quad\quad\quad (III)$$

in which formulae (I), (II) and (III), $Y_1$ represents a divalent radical selected from the group consisting of

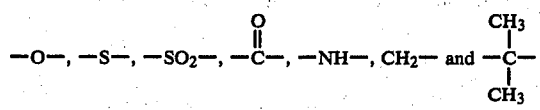

$Ar_1$ represents a member selected from the group consisting of phenylene, naphthylene and biphenylene radicals, each having two valance bonds oriented meta; $Ar_2$ represents a member selected from the group consisting of phenylene, naphthylene and biphenylene radicals, each having two valence bonds oriented coaxially or in parallel to each other and radicals of the formula (IV):

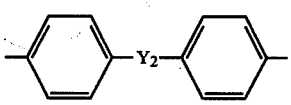
$\quad\quad\quad\quad\quad\quad\quad\quad\quad\quad\quad$ (IV)

wherein $Y_2$ represents a divalent radical selected from the same group as that set forth above for $Y_1$ and is the same as or different from $Y_1$; and $X_1$ and $X_2$ respectively represent a -Co-moiety and $X_3$, $X_4$, $X_5$ and $X_6$ respectively represent a moiety —NH— or —CO— of an amide group —NHCO— or —CONH— and the molar proportions of said recurring units (A), (B) and (C) represented by a triangular composition diagram fall on or within the quadrilateral shown in FIG. 1 and defined by the co-ordinates:

P (A 50, B 5, C 45)
Q (A 5, B 5, C 90)
R (A 5, B 40, C 55) and
S (A 50, B 15, C 35).

except for the side defined by the coordinates P,Q.

2. An aromatic copolyamide as claimed in claim 1 wherein the intrinsic viscosity of said copolyamide is in a range of from 1 to 7, determined in a solution of 0.5 g of said copolyamide dissolved in 100 ml of 98% concentrated sulfuric acid, at a temperature of 30° C.

3. An aromatic copolyamide as claimed in claim 2, wherein said intrinsic viscosity is in a range of from 1.5 to 5.

4. An aromatic copolyamide as claimed in claim 1, wherein $Y_1$ in the formula (I) represents a member selected from the group consisting of —O—, —S—, —SO$_2$— and $$-\overset{\overset{\displaystyle O}{\|}}{C}-$$

radicals.

5. An aromatic copolyamide as claimed in claim 1, wherein $Y_1$ in the formula (I) represents —O— radical.

6. An aromatic copolyamide as claimed in claim 1, wherein $Ar_1$ in formula (II) represents a member selected from the group consisting of phenylene and naphthylene radicals, each having two valence bonds oriented meta.

7. An aromatic copolyamide as claimed in claim 1, wherein $Ar_2$ in the formula (III) represents a member selected from the group consisting of phenylene, naphthylene and biphenylene radicals, each having two valence bonds oriented coaxially or in parallel to each other.

8. An aromatic copolyamide as claimed in claim 1, wherein $Y_1$ in formula (I) represents an —O— radical, $Ar_1$ in formula (II) represents a m-phenylene radical and $Ar_2$ in formula (III) represents a p-phenylene radical.

9. A fiber of filament comprising the aromatic copolyamide as claimed in claim 1.

10. A film comprising the aromatic copolyamide as claimed in claim 1.

* * * * *

UNITED STATES PATENT AND TRADEMARK OFFICE
CERTIFICATE OF CORRECTION

PATENT NO. : 4,355,151
DATED : October 19, 1982
INVENTOR(S) : Keizo Shimada

It is certified that error appears in the above—identified patent and that said Letters Patent is hereby corrected as shown below:

Column 5, line 41: "copolymide" should be --copolyamide--

Column 6, line 62: "N-mehtylformamide" should be --N-methylformamide--

Column 11, line 60: "recuring" should be --recurring--

Column 15, line 32: "flament" should be --filament--

Column 17, line 7: "completey" should be --completely--

Column 18, line 21: "Cum" should be --sum--

Column 20, line 44: "being" should be --been--
line 45: "been" should be --being--

Signed and Sealed this

Fifth Day of July 1983

[SEAL]

Attest:

GERALD J. MOSSINGHOFF

Attesting Officer    Commissioner of Patents and Trademarks